US00RE50624E

(19) United States
(12) Reissued Patent
Vaziri

(10) Patent Number: US RE50,624 E
(45) Date of Reissued Patent: Oct. 7, 2025

(54) METHOD AND APPARATUS FOR SUPER RESOLUTION IMAGING AND EYE TRACKING DEVICES

(71) Applicant: Optics Innovation LLC, Portland, ME (US)

(72) Inventor: Masoud Vaziri, Richardson, TX (US)

(73) Assignee: Optics Innovation LLC, Portland, ME (US)

(21) Appl. No.: 18/891,778

(22) Filed: Sep. 20, 2024

Related U.S. Patent Documents

Reissue of:
(64) Patent No.: 11,367,164
Issued: Jun. 21, 2022
Appl. No.: 16/687,675
Filed: Nov. 18, 2019

U.S. Applications:
(60) Provisional application No. 62/881,961, filed on Aug. 2, 2019, provisional application No. 62/769,438, filed on Nov. 19, 2018.

(51) Int. Cl.
*G06T 3/00* (2024.01)
*G02B 27/00* (2006.01)
(Continued)

(52) U.S. Cl.
CPC ..... *G06T 3/4053* (2013.01); *G02B 27/0093* (2013.01); *G06T 3/4084* (2013.01)

(58) Field of Classification Search
None
See application file for complete search history.

(56) References Cited

U.S. PATENT DOCUMENTS 4,028,725 A 6/1977 Lewis
4,907,296 A 3/1990 Blecha
(Continued)

FOREIGN PATENT DOCUMENTS

CN 106527039 A * 3/2017 ..... G03B 43/00
DE 102014003348 A1 * 9/2014 ..... G01N 21/8806
(Continued)

OTHER PUBLICATIONS

Saito et al., Very High Resolution Image Acquisition Through Image Reconstruction From Lower Resolution Images Taken With Multiple Cameras, Singapore ICCS/ISITA, IEEE 1992 (Year: 1992).*
(Continued)

*Primary Examiner* — Robert J Hance
(74) *Attorney, Agent, or Firm* — Nixon Peabody LLP

(57) ABSTRACT

An eyewear camera as a system is introduced that includes many subsystems. These subsystems include: scene imaging, control methods, tracking a user's eye, methods and techniques to increase the resolution of an image captured by a scene camera, methods to create a viewfinder, and methods to capture an image of a user's eye while simultaneously projecting an image into the user's eye. Such an eyewear will allow a user to capture a scene effortlessly, select an object within the scene, get extra information about the object via a digital personal assistant, or even modify a subset of the scene. Specific applications will be discussed that include visual aid for people with low vision and upgrading existing security cameras via proposed single camera super resolution techniques.

16 Claims, 11 Drawing Sheets

Figure 1:
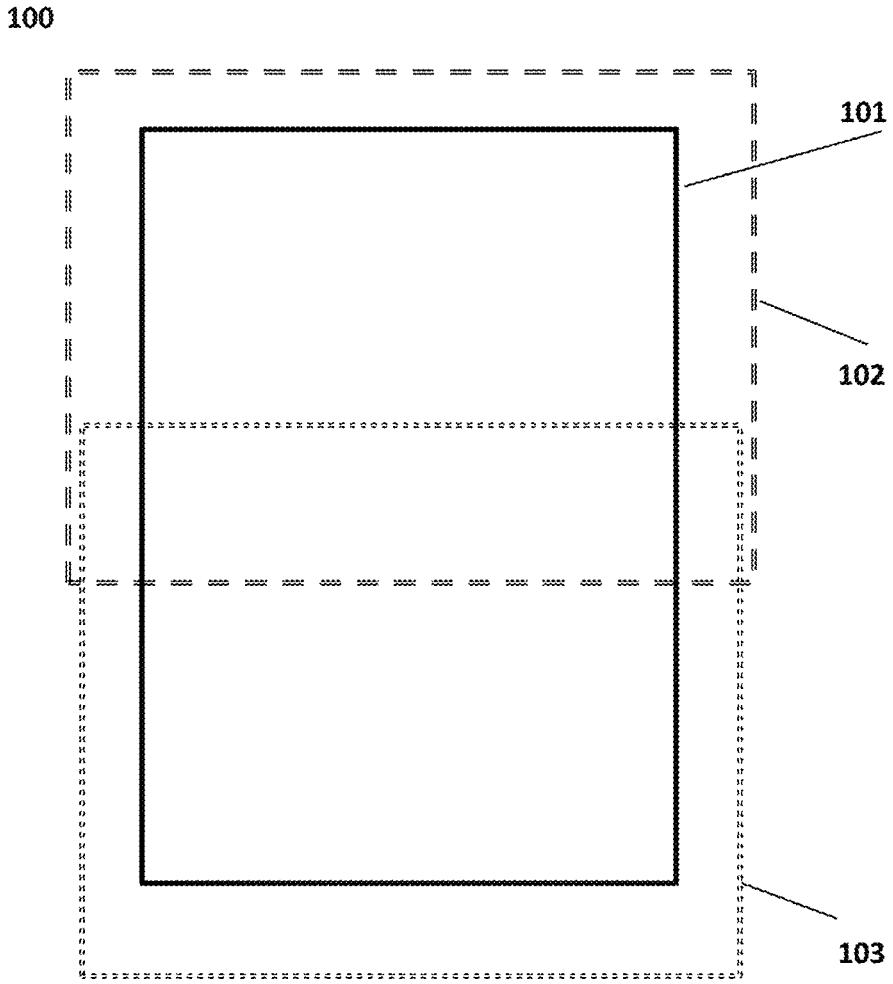

(51) Int. Cl.
*G06T 3/4053* (2024.01)
*G06T 3/4084* (2024.01)

(56) References Cited

U.S. PATENT DOCUMENTS 5,262,871 A 11/1993 Wilder et al.
5,856,811 A 1/1999 Shih
5,859,921 A 1/1999 Suzuki
6,163,336 A 12/2000 Richards
6,198,485 B1 3/2001 Mack et al.
6,285,799 B1 * 9/2001 Dance ..... G06T 5/73 382/260
6,307,526 B1 10/2001 Mann
6,434,280 B1 8/2002 Peleg
6,486,799 B1 11/2002 Still et al.
6,661,495 B1 12/2003 Popovich
6,766,067 B2 7/2004 Freeman
6,850,629 B2 2/2005 Jeon
7,023,464 B1 4/2006 Harada et al.
7,331,671 B2 2/2008 Hammond
7,391,887 B2 6/2008 Durnell
7,492,926 B2 2/2009 Kang
7,697,024 B2 4/2010 Currivan et al.
7,715,658 B2 5/2010 Cho
7,894,666 B2 2/2011 Mitarai et al.
8,014,632 B2 9/2011 Matsumoto
8,139,089 B2 3/2012 Doyle et al.
8,159,519 B2 * 4/2012 Kurtz ..... H04N 7/147 348/14.01
8,305,899 B2 11/2012 Luo et al.
8,432,492 B2 4/2013 Deigmoeller et al.
8,666,196 B2 * 3/2014 Young ..... G06T 3/4015 382/280
8,872,910 B1 10/2014 Vaziri
9,131,223 B1 * 9/2015 Rangarajan ..... H04N 9/3194
9,438,491 B1 9/2016 Van Broeck
9,438,819 B2 9/2016 Van Broeck
9,618,746 B2 4/2017 Browne
9,674,490 B2 6/2017 Koravadi
9,727,790 B1 8/2017 Vaziri ..... G02B 27/0093
9,779,311 B2 10/2017 Lee et al.
9,811,946 B1 * 11/2017 Hung ..... G06T 3/4038
9,858,676 B2 1/2018 Bostick et al.
9,864,372 B2 1/2018 Chen et al.
10,039,445 B1 8/2018 Torch
10,064,552 B1 9/2018 Vaziri
10,708,514 B2 7/2020 Haltmaier
11,189,017 B1 11/2021 Bagai
11,287,262 B2 3/2022 Dooley
2003/0122930 A1 7/2003 Schofield
2004/0212882 A1 10/2004 Liang
2004/0218834 A1 11/2004 Bishop
2006/0033992 A1 2/2006 Solomon
2006/0279585 A1 * 12/2006 Milanfar ..... G06T 5/73 345/694
2007/0041663 A1 2/2007 Cho
2007/0115349 A1 5/2007 Currivan et al.
2008/0010060 A1 1/2008 Asano
2008/0030592 A1 2/2008 Border
2008/0036875 A1 2/2008 Jones et al.
2008/0198324 A1 8/2008 Fuziak
2008/0291295 A1 11/2008 Kato
2008/0297589 A1 12/2008 Kurtz
2009/0189974 A1 7/2009 Deering
2010/0053555 A1 3/2010 Enriquez et al.
2010/0103276 A1 4/2010 Border
2010/0128135 A1 5/2010 Filipovich
2010/0157078 A1 6/2010 Atanassov
2010/0157079 A1 6/2010 Atanassov
2010/0208207 A1 8/2010 Connell, II
2010/0240988 A1 9/2010 Varga et al.
2010/0254630 A1 10/2010 Mi et al.
2010/0277619 A1 11/2010 Scarff
2010/0289941 A1 11/2010 Ito et al.
2010/0290668 A1 11/2010 Friedman
2010/0290685 A1 11/2010 Wein
2011/0263946 A1 10/2011 El Kaliouby
2011/0279666 A1 11/2011 Strombom et al.
2012/0257005 A1 10/2012 Browne
2013/0121525 A1 5/2013 Chen
2013/0242057 A1 9/2013 Hong
2014/0146153 A1 5/2014 Birnkrant
2014/0253738 A1 * 9/2014 Mullis ..... H04N 13/257 348/187
2014/0267890 A1 * 9/2014 Lelescu ..... H01L 27/14623 348/373
2014/0313335 A1 10/2014 Koravadi
2015/0009550 A1 1/2015 Misago
2015/0209002 A1 7/2015 De Beni
2016/0012280 A1 1/2016 Ito
2016/0179093 A1 6/2016 Prokorov
2016/0225192 A1 8/2016 Jones
2017/0007351 A1 1/2017 Yu
2017/0019599 A1 * 1/2017 Muramatsu ..... H04N 5/23287
2017/0099479 A1 4/2017 Browd
2017/0142312 A1 5/2017 Dal Mutto
2017/0181802 A1 6/2017 Sachs
2017/0225336 A1 * 8/2017 Deyle ..... G08B 13/196
2017/0322410 A1 11/2017 Watson
2017/0360578 A1 12/2017 Shin
2017/0371142 A1 * 12/2017 Anthony ..... H04N 1/00
2018/0012413 A1 1/2018 Jones
2018/0330473 A1 11/2018 Foi
2019/0175214 A1 6/2019 Wood
2019/0254754 A1 8/2019 Johnson
2020/0041261 A1 * 2/2020 Bernstein ..... F21V 1/08
2020/0077033 A1 3/2020 Chan
2020/0117025 A1 4/2020 Sauer
2020/0330179 A1 10/2020 Ton
2021/0067764 A1 3/2021 Shau

FOREIGN PATENT DOCUMENTS

GB 2500417 A * 9/2013 ..... A63F 13/06
WO WO-2011004378 A1 * 1/2011 ..... G06T 3/4053
WO WO-2012018282 A1 * 2/2012 ..... G06T 3/00
WO WO-2013167901 A1 * 11/2013 ..... G06F 3/017
WO WO-2014169197 A1 * 10/2014 ..... G02B 21/06

OTHER PUBLICATIONS

"A High Speed Eye Tracking System with Robust Pupil Center Estimation Algorithm", Proceedings of the 29th Ammal International Conference of the IEEE EMBS, 25 Kyon, France, pp. 3331-3334, Aug. 2007.

"A Novel Approach of Video-Based Pupil Tracking", Proceedings of the 2009 IEEE International Conference on Systems, Man and Cybernetics, San Antonio, Tex., USA—pp. 1255-1262, Oct. 2009. Barbara Zitova et al.; Image Registration Methods: a Survey; Department of Image Processing; Institute of Information Theory and Automation Academy of Sciences of the Szech Republic; Image and Vision Computing; pp. 977-1000.

B. K. Gunturk, "Super-resolution imaging", in Compu-tational Photography Methods and Applications, by R. Lukac, CRC Press, 2010 [Abstract Provided].

Cheng et al. Developing a Real-Time Identify-and-Locate System for the Blind. Workshop on Computer Vision Applications for the Visually Impaired, James Coughlan and Roberto Manduchi, Oct. 2008, Marseille, France.

D. Li, D. Winfield and D. Parkhurst, "Starburst: A Hybrid algorithm for video based eye tracking combining feature-based and model-based approaches", Iowa State Univer-sity, Ames, Iowa.

Extrema.m, http:/lwww.malhworks.com/mallabcentral/fileexchange/12275-extrema-m-extrema2-m, Sep. 14, 2006.

Eyelink User Manual, SR Research Lid., Version 1.3.0, Copyright 2005-2008, 134 pages.

Eyelink Data Viewer User's Manual, SR Research Lid., Copyright 2002-2008, Document Version 1.8.402, 149 pages.

Fritz Gleyo, Microsoft May Make Life-Sized Cortana In Person For HoloLens, (Dec. 14, 2015).

(56) References Cited

OTHER PUBLICATIONS

Guestrin et al. "General Theory of Remote Gaze Estimation Using the Pupil Center and Corneal Reflections", IEEE Trans. Biomedical Eng., vol. 53, No. 6, pp. 1124-1133, Jun. (2006).
Jessi Hempel, Project HoloLens: Our Exclusive Hands-On With Microsoft's Holographic Goggles, (Jan. 21, 2015).
J. Goodman, Introduction to Fourier Optics, Second Ed., 160-165, McGraw-Hill, 1988.
Jordan Novet, Microsoft could build a life-sized Cortana for HoloLens, https://www.technologyrecord.com/Article/introducing-microsoft-hololens-development-edition-48296.
Kennet Kubala et al.; Reducing Complexity in Computational Imaging Systems; CDM Optics, Inc.; Sep. 8, J003; vol. 11, No. 18; Optics Express; pp. 2102-2108.
Lees et al. (Ultrasound Imaging in Three and Four Dimensions, Seminars in Ultrasound, CT, and MR/, vol. 22, No. 1 Feb. 2001: pp. 85-105, (Year: 2001).
Lindsay James, Introducing Microsoft HoloLens Development Edition, https://blogs.windows.com/ :levices/2015/04/30/build-2015-a-closer-look-at-the-microsoft-hololens-hardware/.
Malcolm et al. Combining topdown processes to guide eye movements during real-world scene search. Journal of Vision, 10(2):4, p. 1-11 (2010).
Maria E. Angelopoulou et al.; FPGA-based Real-lime Super-Resolution on an Adaptive Image Sensor; Department of Electrical and Electronic Engineering, Imperial College London; 9 pages.
Moreno et al. Classification of visual and linguistic tasks using eye-movement features; Journal of Vision (2014) 14(3):11, 1-18.
P. C. Hansen, J. G. Nagy, D. P. O'Leary, Deblurring Images: matrices, Spectra and Filtering, SIAM (2006) [Abstract Provided].
P. Milanfar, Super-Resolution Imaging, CRC Press (2011) [Abstract Provided].
Pravin Bhat et al.; Using Photographs to Enhance Videos of a Static Scene; University of Washington; Microsoft Research; Adobe Systems; University of California; The Eurographics Association 2007; pp. 1-12.
R. W. Gerchberg, "Super-resolution through energy reduction", Optica Acta, vol. 21, No. 9, pp. 709-720 (1974).
S. Chaudhuri, Super-Resolution Imaging, Kluwer Aca-demic Publishers (2001) [Abstract Provided].
Sang-Hyuck Lee et al.; Breaking Diffraction Limit of a Small F-Number Compact Camera Using Wavefront Coding; Center for Information Storage Device; Department of Mechanical Engineering, Yonsei University, Shinchondong, Sudaemungu, Seoul 120-749, Korea; Sep. 1, 2008; vol. 16, No. 18; p. 13569-13578.
S.-W Jung and S.-J. Ko, "Image deblurring using multi-exposed images" in Computational Photography 65 Methods and Applications, by R. Lukac, CRC Press, 2010. [Abstract Provided].
Todd Holmdahl, Build 2015: A closer look at the Microsoft HoloLens hardware, https://blogs.windows.com/ :levices/2015/04/30/build-2015-a-closer-look-at-the-microsoft-hololens-hardware/.
V. Barmore, Iterative-Interpolation Super-Resolution Image Reconstruction, Springer (2009) [Abstract Provided].
W. Thomas Cathey et al.; New Paradigm for Imaging Systems; Optical Society of America; Applied Optics; Oct. 10, 2002; vol. 41, No. 29; pp. 6080-6092.
William T. Freeman et al.; Example-Based Super-Resolution; Mitsubishi Electric Research Labs; March/April J002; IEEE Computer Graphics and Applications; pp. 56-65.
John Bardsley et al.; Blind Iterative Restoration of Images With Spatially-Varying Blur; 9 pages.
Sang-Hyuck Lee et al.; Breaking Diffraction Limit of a Small F-Number Compact Camera Using Wavefront Coding; Center for Information Storage Device; Department of Mechanical Engineering, Yonsei University, Shinchondong, Sudaemungu, Seoul 120-749, Korea; Sep. 1, 2008; vol. 16, No. 18; pp. 13569-13578.
Tod R. Lauer; Deconvolution With a Spatially-Variant PSF; National Optical Astronomy Observatory; Tucson, AZ; arXiv:astro-ph/0208247v1; Aug. 12, 2002; 7 pages.
Suk Hwan Lim and Amnon Silverstein; Estimation and Removal of Motion Blur by Capturing Two Images With Different Exposures; HP Laboratories and NVidia Corp.; HPL-2008-170; Oct. 21, 2008; 8 pages.
William T. Freeman et al.; Example-Based Super-Resolution; Mitsubishi Electric Research Labs; Mar./Apr. 2002; IEEE Computer Graphics and Applications; pp. 56-65.
Edward R. Dowski, Jr. et al.; Extended Depth of Field Through Wave-Front Coding; Apr. 10, 1995; Optical Society of America; vol. 34, No. 11; Applied Optics pp. 1859-1866.
Maria E. Angelopoulou et al.; FPGA-based Real-time Super-Resolution on an Adaptive Image Sensor Department of Electrical and Electronic Engineering, Imperial College London; 9 pages.
Patrick Vandewalle et al.; A Frequency Domain Approach to Registration of Aliased Images with Application to Super-resolution; Ecole Polytechnique Federal de Lausanne, School of Computer and Communication Sciences; Department of Electrical Engineering and Computer Sciences, University of California; EURASIP Journal on Applied Signal Processing; vol. 2006, Article ID 71459, pp. 1-14.
Danny Keren et al.; Image Sequence Enhancement Using Sub-pixel Displacements; Department of computer science; The Hebrew University of Jerusalem; 1988 IEEE; pp. 742-746.
Athanasios Papoulis; A New Algorithm in Spectral Analysis and Band-Limited Extrapolation; IEEE Transactions on Circuits and Systems, Sep. 1975; vol. CAS-22, No. 9; pp. 735-742.
W. Thomas Cathey ey al.; New Paradigm for Imaging Systems; Optical Society of America; Applied Optics; Oct. 10, 2002; vol. 41, No. 29; pp. 6080-6092.
Oliver Bowen et al.; Real-Time Image Super Resolution Using an FPGA; Department of Electrical and Electronic Engineering; Imperial College London; 2008 IEEE; pp. 89-94.
Kennet Kubala et al.; Reducing Complexity in Computational Imaging Systems; CDM Optics, Inc.; Sep. 8, 2003; vol. 11, No. 18; Optics Express; pp. 2102-2108.
Maria E. Angelopoulou et al.; Robust Real-Time Super-Resolution on FPGA and an Application to Video Enhancement; Imperial College London; ACM Journal Name; Sep. 2008; vol. V, No. N; pp. 1-27.
Eran Gur and Zeev Zalevsky; Single-Image Digital Super-Resolution a Revised Gerchberg-Papoulis Algorithm AENG International Journal of Computer Science; Nov. 17, 2007; pp. 1-5.
Lisa Gottesfeld Brown; A Survey of Image Registration Techniques; Department of Computer Science Columbia University; Jan. 12, 1992; pp. 1-60.
Pravin Bhat Ei Al.; Using Photographs to Enhance Videos of a Static Scene; University of Washington; Microsoft Research; Adobe Systems; University of California; The Eurographics Association 2007; pp. 1-12.
Guestrin et al. "General Theory of Remote Gaze Estimation Using the Pupil Center and Comeal Reflections", IEEE Frans. Biomedical Eng., vol. 53, No. 6, pp. 1124-1133, June (2006).
Malcolm et al. Combining topdown processes to guide eye movements during real-world scene search. Journal of Mision, 10(2):4, p. 1-11 (2010).
Extrema.m, http://www.mathworks.com/matlabcentral/fileexchange/12275-extrema-m-extrema2-m, Sep. 14, 2006.

* cited by examiner

600

METHOD AND APPARATUS FOR SUPER RESOLUTION IMAGING AND EYE TRACKING DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This patent application] *This is an application for reissue of U.S. Pat. No. 11,367,164, granted on Jun. 21, 2022, from U.S. patent application No. 16/687,675, filed on Nov. 18, 2019, which* claims the [benefits] *benefit* of *and priority to* U.S. Provisional Application No. 62/769,438, filed Nov. 19, [2019] *2018*, [and entitled "Method and Apparatus for High Resolution Imaging and Eye Tracking Devices";] and U.S. Provisional Application No. 62/881,961, filed Aug. 2, 2019, [and entitled "Smart Home and Neighborhood Security System" all] *each* of which [are] *is hereby* incorporated by reference herein. [This patent application is also a continuation in part of U.S. patent application Ser. No. 15/400,399, filed Jan. 7, 2017, and entitled METHOD AND APPARATUS FOR A COMPACT AND HIGH RESOLUTION MIIND-VIEW COMMUNICATOR, which is a continuation of U.S. patent application Ser. No. 13/175,421, filed Jul. 1, 2011, and entitled METHOD AND APPARATUS FOR A COMPACT AND HIGH RESOLUTION MIIND-VIEW COMMUNICATOR, which is a continuation-in-part of U.S. patent application Ser. No. 12/794,283, filed Jun. 4, 2010, and entitled METHOD AND APPARATUS FOR A COMPACT AND HIGH RESOLUTION EYE-VIEW RECORDER, which claims the benefit of U.S. Provisional Application No. 61/184,232, filed Jun. 4, 2009, and entitled METHODS AND APPARATUS FOR A COMPACT AND HIGH RESOLUTION EYE-VIEW RECORDER, all of which are incorporated by reference herein. U.S. patent application Ser. No. 13/175,421 claims the benefits of U.S. Provisional Application No. 61/369,618, filed Jul. 30, 2010, and entitled "Applications for a Compact and High Resolution Eye-View Recorder"; U.S. Provisional Application No. 61/471,397, filed Apr. 4, 2011, and entitled "Eye Tracking Device, Apparatus, and Algorithms"; and U.S. Provisional Application No. 61/369,618, filed Apr. 4, 2011, and entitled "Software-Enabled High Resolution Compact Video Recorder" all of which are incorporated by reference herein.]

TECHNICAL FIELD

Embodiments of the invention relate to systems, devices and methods for capturing, enhancing and modifying images captured by an imaging device. Techniques are discussed to select an object within the field of view of a user via various pointing methods including eye and gaze tracking. Techniques are also introduced to increase the optical resolution of a camera beyond its inherent capabilities via computational techniques. Several applications are presented including methods to help people with low vision and methods to increase optical resolution of a security camera.

BACKGROUND

Hand-held cameras are inconvenient for people who want to live an experience and record it. Hand-held cameras have to be held and pointed properly. A tripod can hold a camera but continuously pointing a camera requires the user's attention and involvement. The user has to make sure the scene is recorded properly and all subjects of interests are within the recording frame or within the field of view of the camera. This requires user's attention and involvement. An ideal camera will be hands-free and attention-free.

A security camera, in general, monitors a scene and when it detects a motion, it starts capturing images of the scene. Often the captured images do not have sufficient details because the resolution is not sufficient. This usually occurs with low cost cameras and in situations where there is a space limitation such as in the case of hidden cameras. In such and similar cases, the resolution of the captured images often need to be increased. In this disclosure a few solutions are offered to achieve that objective. Also methods are discussed to simplify eye tracking and gaze tracking techniques so that they can be implemented at a lower cost or complexity.

SUMMARY

An eyewear camera as a system is introduced that includes many subsystems. These subsystems include: scene imaging, control methods, tracking a user's eye, methods and techniques to increase the resolution of an image captured by a scene camera, methods to create a viewfinder, and methods to capture an image of a user's eye while simultaneously projecting an image into the user's eye. Such an eyewear will allow a user to capture a scene effortlessly, select an object within the scene, get extra information about the object via a digital personal assistant, or even modify a subset of the scene. Specific applications will be discussed that include visual aid for people with low vision and upgrading existing security cameras via proposed single camera super resolution techniques.

BRIEF DESCRIPTIONS OF DRAWINGS

FIG. 1. Covering a desired field of view 101 via two cameras with fields of view of 102 and 103. The two fields of view have some overlap and capture slightly more than the desired field of view 101.

Figure 2A:
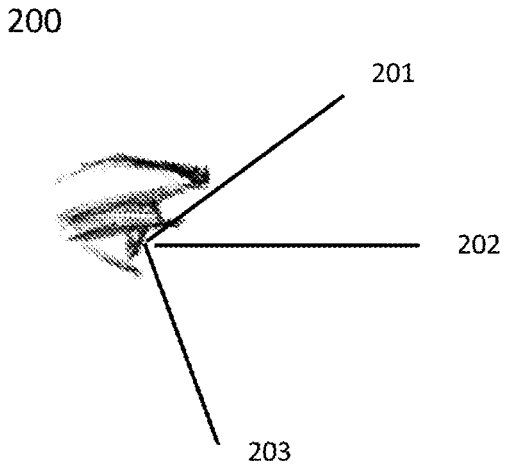
Figure 2B:
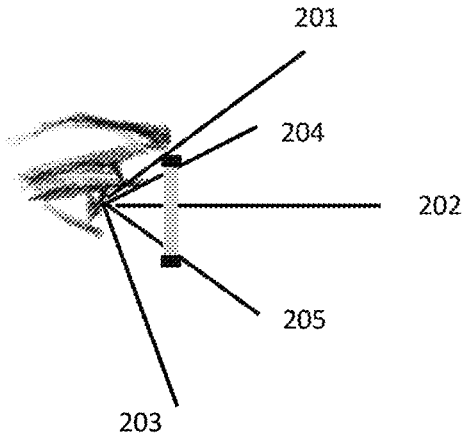

FIG. 2. Vertical field of view of a human eye has an upper limit denoted by 201 and a lower limit denoted by 203 (FIG. 2a). The horizon direction is shown by 202. When a user wears an eyewear the vertical field of view seen through a lens of the eyewear is reduced (FIG. 2b). The reduced field of view is shown by rays 204 and 205. At a minimum, an eyewear with a single scene camera will have a vertical field of view that its upper and lower limits are 204 and 205, respectively.

Figure 3A:
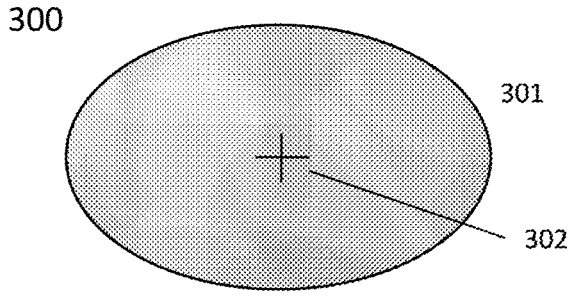
Figure 3B:
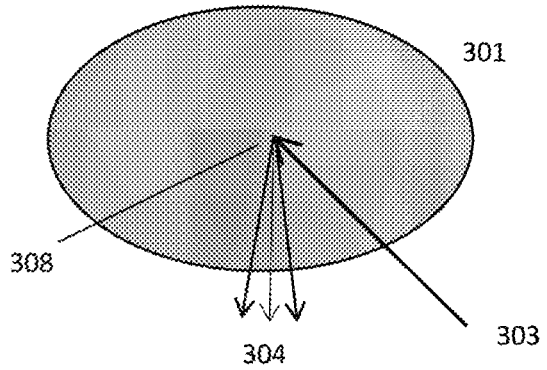
Figure 3C:
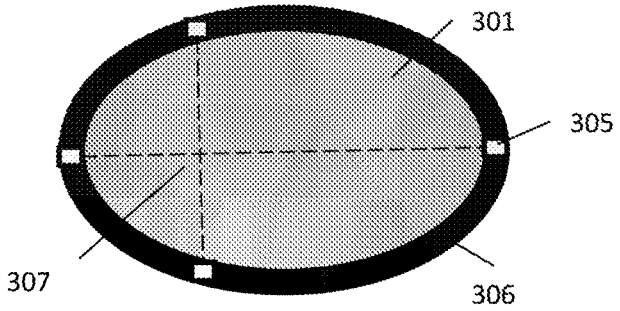

FIG. 3. Methods to create a permanent 302 (FIG. 3a), temporarily 308 (FIG. 3b), and a virtual marker 307 (FIG. 3c) on a lens 301 of an eyewear. The marker is placed in such a way that when a user looks through it, the user will be looking at an area very close to the center of the field of view of a scene camera of an eyewear. 303 is an incoming light beam that is partially reflected at 308 towards a user's eye 304.

Figure 4:
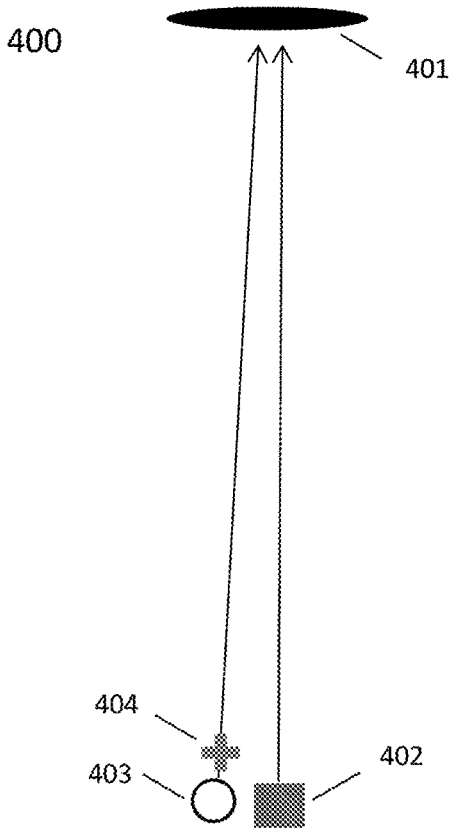

FIG. 4. A simple method to allow a user to point at an object 401 via a marker 404 place on a lens of an eyewear. The user's eye 403 is very close to the scene camera module 402. When a user looks along the marker, the user is looking at an area of the scene image that is very close to the center of the scene image.

Figure 5A:
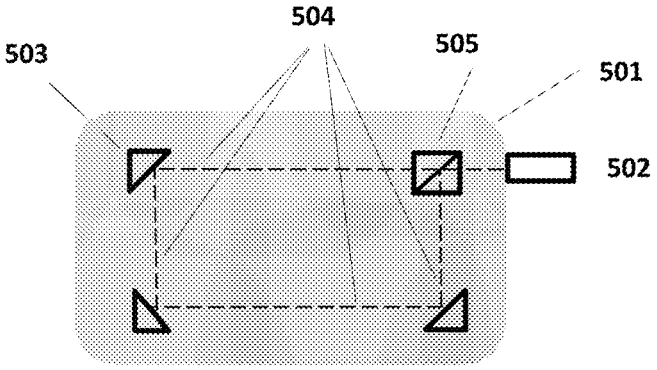
Figure 5B:
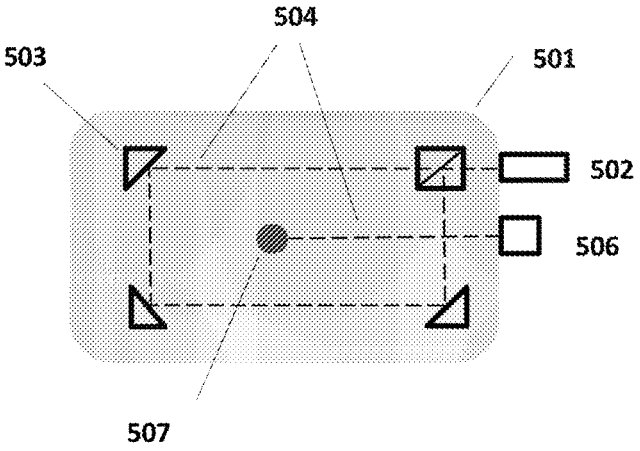
Figure 5C:
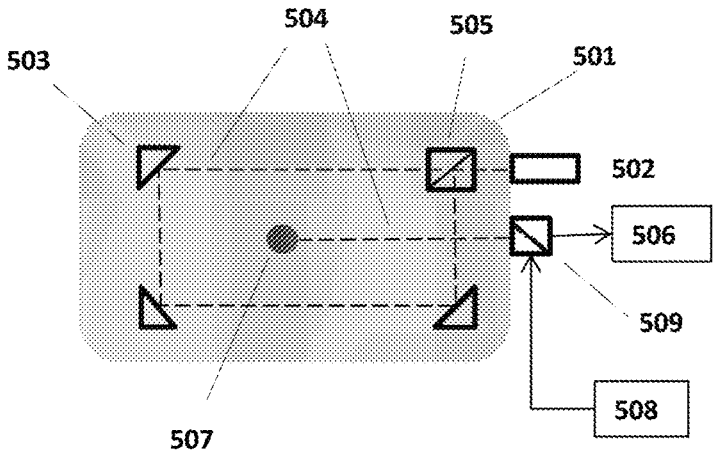

FIG. 5. Using embedded waveguides 504 within an eyewear's lens 501 allows an eyewear camera's processor to communicate visually with a user via visible light signaling. The light from source 502 traverses a rectangular path and partially is reflected towards a user's eye to serve as a view finder. The same waveguides can also be used to illuminate a user's eye with infra-red light for eye tracking purposes. Corner reflectors 503 help redirect an incoming light from one waveguide to the next. Splitter 505 will send the incoming light from 502 in two different directions through the waveguides. A focusing lens 507 can collect light from a user's eye area and via an embedded waveguide direct the collected light to an optical receiver 506 (FIG. 5b). In FIG. 5c, the collecting lens 507 is also used to project a light from source 508 to a user's eyes. The coupler 509 allows receiving light from the collecting lens as well as transmitting light to a user's eye.

Figure 6A:
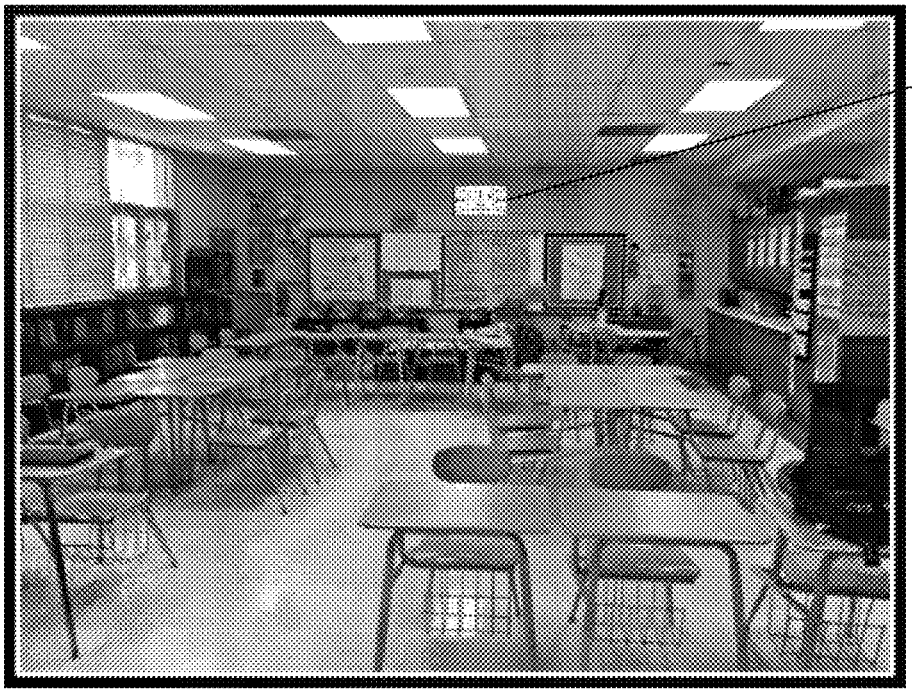
Figure 6B:
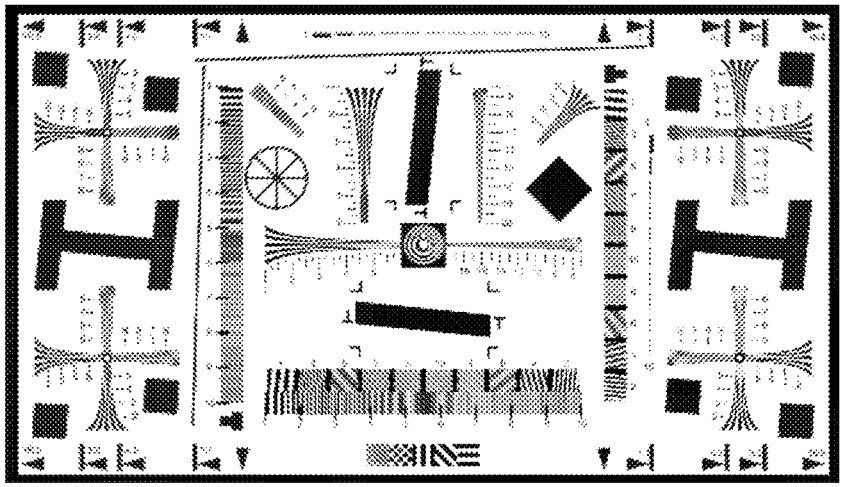

FIG. 6. A scene that includes an added high resolution poster 601 on a wall (FIG. 6a). The poster 601 is shown in higher details in FIG. 6b.

Figure 7:
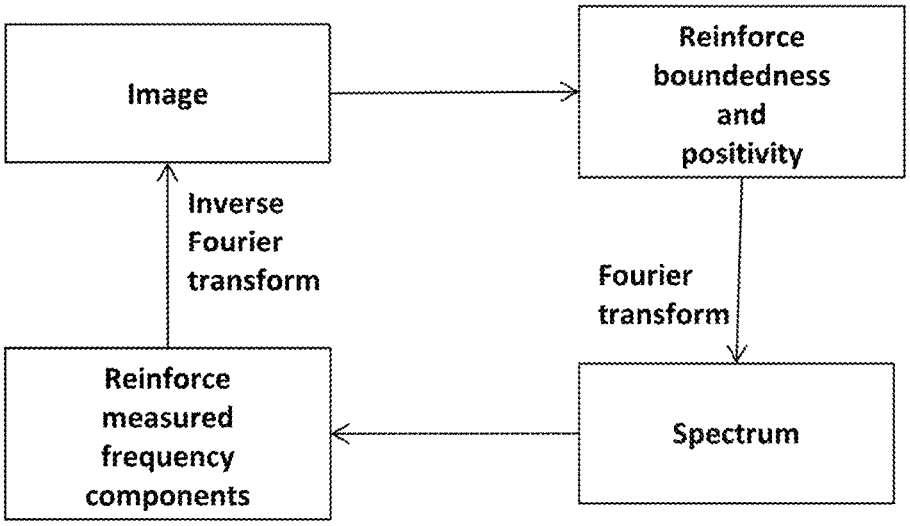

FIG. 7. A bandwidth extrapolation method to achieve optical super resolution.

Figure 8:
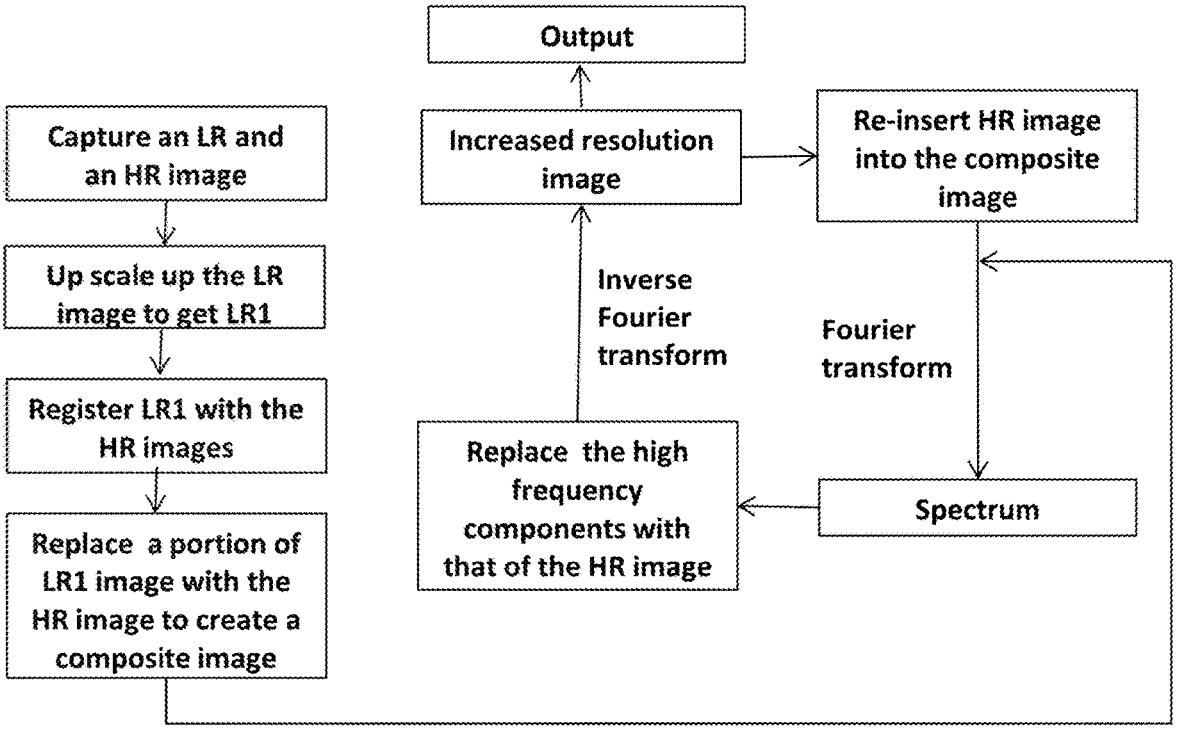

FIG. 8. Another implementation of the method presented in FIG. 7. Two initial images are Low Resolution (LR) and High Resolution (HR) images. The up-scaled LR is called LR1.

Figure 9:
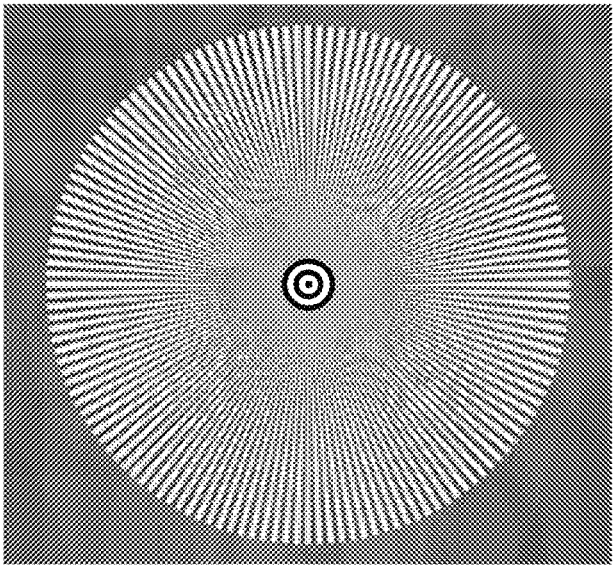

FIG. 9. High resolution patterns that include a portion of a standard pattern that can be used to measure the modulation transfer function of an imaging system.

Figure 10A:
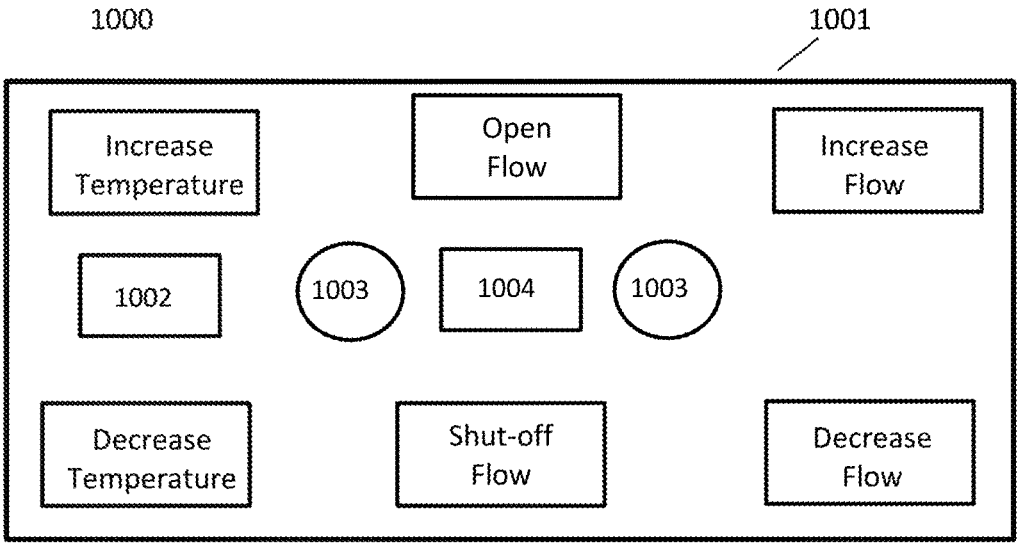

FIG. 10. Schematic of an eye tracking based sensing unit for gaze based fluid flow control (FIG. 10a). Infrared LED 1003 is used to facilitate eye tracking via the eye tracking camera 1004. A second camera 1002 is used for face recognition and to aid the eye tracker to find a user's eyes faster. The sensing unit 1001 is in communication with the flow control hardware 1002 to control the hardware.

DETAILED DESCRIPTIONS

An eyewear camera as a system includes many subsystems. These subsystems include: scene imaging, methods to control the scene cameras, methods and devices to receive an input from a user, methods and devices to track a user's attention to a subset of a scene, methods and techniques to increase the resolution of an image captured by a scene camera, methods to create a viewfinder, and methods to capture an image of a user's eye while simultaneously projecting an image into the user's eye. Such an eyewear will allow a user to capture the scene effortlessly, select an object within the scene, ask a digital personal assistant questions about the object, or even modify a subset of the scene. Specific applications will be discussed.

Scene Cameras

Scene cameras are used to capture a scene within a field of view (FOV) of a user who is wearing a wearable camera or an eyewear camera. The scene may be captured with a single camera or two or more. When simplicity and cost is important, a single camera will be sufficient. However, when high optical resolution is needed, multi-camera should be used. A basic two camera setup is designed such that a desired FOV is split between the two cameras. Existing cameras have a horizontal FOV (HFOV) which is larger than their vertical FOV (VFOV). In applications discussed in this disclosure, the vertical FOV should be at least 90 degrees. A value of 120 degrees vertical FOV will be a good choice for most applications. FIG. 1 shows how to achieve a large vertical FOV with two cameras be pointing the two cameras in such a way that the two FOVs have some overlap while they cover a desired vertical FOV. In FIG. 1, the desired FOV 101 is split between the FOV of two cameras with FOVs of 102 and 103. The two FOVs have some overlap and the cameras capture more than the desired FOV 101. This is done to provide some extra margin for objects that are at the boundaries of the desired FOV.

Controlling the Scene Camera System

There are a number of ways to select a single scene camera from the many scene cameras that form the scene camera systems. These include: tracking a user's gaze point, selecting a single camera manually from a graphical user interface, using a voice command, and using hand gestures. Accurate gaze tracking via eye tracking has been previously presented in other disclosures. In this disclosure simpler and lower cost gaze tracking are presented that are more suitable for capturing a task or an activity that a user is doing or performing primarily with the user's hands. These new gaze trackers will track a gaze area rather than a gaze point. A gaze point tracker will need a traditional eye tracker and have a huge number of potential gaze points as a user rolls his eyes around. A gaze area tracker is implemented by dividing a field of view into at least two areas and the gaze tracker determines which of the at least two areas a user is looking at. A simple gaze area tracker (GAT) has only two outputs, one associated with each of the two areas. A refined GAT will have three outputs: up, middle, down. These outputs are selected based on a user's eye movement in the vertical direction. For a two camera system, each scene cameras is arranged in such a way that it is pointed primarily at one of the two gaze areas. The FOVs of 102 and 103 in FIG. 1 may represent such a split in the vertical field of view even though there is some overlap.

Human field of view in the vertical direction is about 130 degrees of which about 50 degrees is above horizon (upper limit) and 80 degrees below the horizon (lower limit). See FIG. 2a. When someone wears a pair of eyeglasses, his vertical field of view is partially blocked by the rim of the eyeglasses frame that holds a lens in place, see FIG. 2b. A two camera system must cover this reduced vertical field of view while having some overlap and margin on the top and bottom of the VFOV. For a reduced vertical field of view of 100 degrees and 10 degrees of margin on the top and bottom, and 20 degrees of overlap, each of the two cameras must have a vertical FOV of 70 degrees.

Human's normal line of sight is about 10 degrees below the horizon line. Hence if a single camera is used to capture the entire required VFOV, it should be tilted downward by at least 10 degrees below the horizon line.

In certain applications, one may use a single scene camera instead of two or more. In such a case, one should orient a camera module is such a way that its vertical field of view (VFOV) is larger than its horizontal field of view (HFOV). Cameras are generally specified by their diagonal FOV (DFOV) and are used in the landscape mode where the HFOV is larger than VFOV. In portrait mode, VFOV is larger than HFOV. A large VFOV can easily be split into two vertical subsets. As an example, consider a camera module with a DFOV=150 degrees. For this camera in landscape mode, HFOV=146 degrees and VFOV=123 degrees. If the camera is rotated by 90 degrees, it will be in portrait mode and will have VFOV=146 and HFOV=123 degrees. 146 degrees is sufficient to cover the entire vertical FOV of a user.

To monitor the gaze direction, two solutions are offered below. For these solutions, at least an area of one eye of a user needs to be illuminated via an infrared (IR) light source so that the solution can work under any lighting condition, even at night. Infrared light is used because it is not detected (seen) by human eyes and hence not distractive.

Infrared LEDs may be used to illuminate at least a portion of one eye of the user, this will be the eye that will be monitored by an eye tracker or eye monitor that is used for gaze tracking. The LEDs are modulated in order to differentiate them from any other infrared light source in the area, including sunlight. Each LED may also be modulated with a unique tone or frequencey to differentiate it from the other illuminating LEDs when measured by a light detector. Alternatively, a waveguide layer embedded within a lens of the eyewear may be used to bring IR lights from an IR source to the lens area of the eyewear.

First Gaze Tracking Solution: In this approach, at least one tiny camera module (for example a width and height less than 2×2 mm^2) is used to repeatedly take pictures of at least one eye of the user and a processor will process the pictures to locate at least one feature on the eye surface of the user. The feature might be the user's pupil, or an IR reflection point from the eye surface. The at least one camera will use an optical filter that transmits only the infrared light and heavily attenuates the background light. The bandwidth of the filter is chosen according to the bandwidth of the infrared LEDs and their wavelengths.

To distinguish a background infra-red light from the illuminating LEDs when using a camera module, one may periodically turn on and off the LEDs in such a way that the eye area is illuminated every other image. By subtracting two consecutive images, the contribution due to the background light can be cancelled out or minimized.

Second Gaze Tracking Solution: In this approach, at least one PIN or avalanche photodiode or detector is used to measure the total reflected infrared light power from the eye area. This reflected light is due to the illuminating LEDs. Signal processing is used to measure the amount of reflected light from each LED as each LED is modulated preferably with a unique tone. As the user's eye moves around, the contribution of each LED to the total measured light by the PIN, for example, changes allowing determination of the gaze area of the scene by the user. In effect, this is a single or a few pixel solution version of the first solution. For better accuracy, it is suggested to use an array of PINs and LEDs placed around a rim of the frame in order to illuminate and monitor the eye from different angles. This makes gaze area and gaze point detection easier. In general at least one LED and PIN is needed.

In either of the two solutions, the intensity of the reflected light IR from an eye area can also be used to find out if the user is wearing the eyewear. The eyewear may shut off itself if it's determined that the eyewear is not worn longer than a predetermined amount of time.

For tracking the scene, instead of using two scene cameras, in applications in which the speed of switching from one FOV to a different FOV is not critical, one can also use a single scene camera attached to an actuator. The actuator will point the camera in a desired direction. A signal from a gaze tracking device is used to determine the pointing direction of the camera. Feedback from the gaze tracker is used by a processor to control the actuator. The actuator may also be controlled manually from a user interface.

Camera modules with wavefront coded lenses use less number of lenses (glass or plastic) and hence are lighter, less bulky and thinner. This makes it easier to move and point such a camera module using an actuator to achieve pan and tilt when needed. Use of camera modules with wavefront coded lens is suggested.

Object and Face Recognition: In some applications, a software program running on a processor of an eyewear camera can be used to recognize an object that a user is looking at. Since there are usually more than one object with the FOV of a user, a solution is desired to allow the user to point to an object within a scene. There are a number of ways to point at an area of a scene or a point in the scene: 1) pointing by eye—by monitoring the gaze direction of the user and mapping the gaze point into an image of the scene, and 2) pointing by hand—by monitoring where or what a user is pointing at by his hands or fingers. For example, when a user is reading a text or a book, the user may point to a word with a finger. Once a point on an object is selected, image processing can be used to recognize and identify the object.

Standard eye tracking can be used to monitor a user's eyes movements and determine a user's gaze direction and gaze point. Usually an eye tracking camera is used to take a picture of the eye to determine the gaze direction. The gaze direction is then mapped to an image of the scene and image processing is used to determine the target or what the user's eye is pointed at. Object or face recognition is then used to identify the target. This approach requires a camera to repeatedly take pictures of at least one eye of a user in order to monitor a user's gaze points.

To reduce the cost and complexity associated with an eye tracking camera and the need to illuminate a user's eye with infrared LEDs, a new solution is presented next that does not require active eye tracking. Instead, a user uses a target marking placed on a lens of the eyewear to point at an object within a scene (See FIG. 3a). To select an object, a user moves his head until his eye, the marking, and the object are on a straight line. In other words, the user moves his head until he sees the marking on the object. The marking (or marker) can be placed on the lens temporarily or permanently. In FIG. 3a, the marker is a target sign placed on a lens. This marker can be permanent. It is also possible to project a marker on the lens using a visible light source as shown in FIG. 3b.

To personalize the location of the marker on the lens, for initial calibration, a user picks a distant object and moves his head while monitoring the video stream from the camera until the object is at the center of the image. In this position, a small marker is placed on the eyewear's lens in such a way that the marker is on or at the center of the object when viewed by the user. This is shown in FIG. 4. Having such a marker on an eyewear camera allows pointing the camera properly at any object without needing an actual view finder. For example, a user will be able to accurately point the camera at a person in a crowd or a product on a shelf among many other products. The user may then ask questions such as: "what is this?" or "who is that?" A digital personal assistant that's in communication with the camera can access the camera images and answer such questions.

As mentioned, the marker sign on the lens can be permanent or temporary. In case of the temporary marker, a light source disposed on the eyewear is used to illuminate a spot on the lens of the eyewear, FIG. 3b. For a permanent marker, a sign, for example a plus sign or circle, can be printed or attached on the lens of the eyewear, FIG. 3a. A virtual marker can also be formed from intersecting two line segments of which the two end points are given, FIG. 3c. The end points will be on the inner side of the rim (visible to the user of the device) near the edges of the lens on the frame, [See FIG. 3c]. Such virtual markers will not be noticed by others. Similar markers on the inner side of the eyeglass frame can also be used to denote the boundaries of an image captured by the camera, which will be close to the boundaries of the FOV of the camera module.

Use of Embedded Waveguides: At least one lens of the eyeglass frame that houses the scene cameras can have embedded waveguides that could serve several purposes including: marking the boundaries of an image frame, illuminating an area of a user's eye, projecting an image into a user's eye, and collecting the back reflected light from a user's eye and forwarding the reflected light towards a camera for eye tracking. A visible light source coupled to the waveguide can be used to mark the boundaries of the image that the scene camera can capture (See FIG. 5a). This feature will be similar to a traditional viewfinder on hand-held cameras or camcorders; the difference is that in this case the real scene is seen by the user's eye as opposed to seeing an image of the scene on a view finder.

A lens that has an embedded waveguide can also be used as a light gathering element to form an image of the eye for image based eye tracking purposes, FIG. 5b. Optical waveguides embedded within a transparent lens have been used to project an image to a user's eyes, for display applications. The same setup that is used to project an image into a user's eyes can be used in the reverse direction to gather the reflected light from a user's eye and transmit it to an image sensor or an optical receiver such as a PIN diode (see FIG. 5b.) For simultaneous eye tracking and image display application, one can use a wavelength sensitive directional coupler to use the same waveguide and lens structure for light gathering and light projection (see FIG. 5c). Light gathering will be for eye tracking and light projection will be for display applications. In FIG. 5c, a setup is shown to achieve: view finder, light gathering and transmit to an image sensor, and light transmit and projection to a user's eye.

With a dual camera embedded in the frame, a depth map of the scene can be calculated. With a depth map and a marker on the lens, a user may ask about the distance of any object from him/her within his/her field of view. Alternatively, without calculating the depth map of the whole scene, the user may use the marker on the lens to point to a specific object and a processor can calculate its distance from the camera with much less computations.

An electro-optics material placed in front of the lens of a camera module can be used to dynamically select a subset of the scene. This is equivalent to pointing the camera in a different direction. However, with an electro-optic material this can be achieved without any mechanical moving parts. An electrical signal is applied to the electro-optics material to achieve selecting a desired FOV. Materials with negative refractive index can also be used for this purpose. The electro-optical material may be deposited or attached on the lens of the camera module.

Sometimes when people wear an imaging eyewear, it's possible that when they capture an image, the horizontal plane of the camera is not parallel to the ground. In such cases, a captured image shows some undesirable tilt in the image frame. To correct for this automatically, an accelerometer is used to monitor and measure the orientation of the camera module and the amount of tilt. Once an image is taken and if the tilt is above a threshold, a processor can use an image rotation procedure to remove the tilt from the image.

High Resolution Imaging

For security application, as an example, one can improve the resolution of a low resolution camera using computational techniques such as super-resolution and bandwidth extrapolation techniques. For example, one can use a dual camera setup. It is desirable to increase the resolution of an existing security camera without installing any new cameras.

In super-resolution theory based on bandwidth extrapolation, all is needed is to have a subset of the scene in higher resolution. With dual camera setup, the second camera has a higher resolution than the first camera and image from the second camera is used to increase the resolution of the first camera. This process requires image registration and projection. The super resolution solution offered below requires only one camera which will be considered as a low resolution camera. Rather than using a second high resolution camera, a known high resolution poster or picture is placed within the FOV of a single camera that its resolution needs to be increased. When this single camera takes an image of the scene, a portion of the image will be due to the high resolution poster or picture that was added to the scene. Since this poster or picture is a known image, it can be used to increase the resolution of the image from the single camera using a bandwidth extrapolation technique.

An example is shown in FIG. 6a. This is a picture of a classroom in which a high resolution poster (FIG. 6b) is placed on a wall of the classroom. To enhance this image, the portion of the captured image corresponding to the known high resolution poster in the scene will be replaced by a high resolution image of the poster taken from the same perspective as the low resolution camera. This combined image is enhanced (its resolution increased) iteratively using a bandwidth extrapolation technique. The theoretical basis of this method is discussed in "Introduction to Fourier Optics," by Joseph Goodman. FIGS. 7 and 8 illustrate the resolution enhancement technique using a bandwidth extrapolation technique.

The approach of adding a poster or a well-known object to the scene is suitable for a fixed camera monitoring a fixed space. Instead of a poster, it is also possible to place a TV monitor or a projector to display a known high resolution pattern. In open spaces, containers or sculptures may be used as known high resolution objects.

It is also possible to place a reference color poster or picture in the scene so that the camera can use those colors to reconstruct the scene colors much more accurately. Of course, the two posters can be combined to achieve a dual purpose.

When a known object cannot be placed in the scene, one can use a projector to project a high resolution image into an area of the scene. The projected image could be visible or invisible. For invisible projected image, infrared light is used. The projected high resolution image into the scene is a known high resolution image and can be used in a similar fashion to that of having a high resolution poster to increase the resolution of the images taken by a single camera. The projected patterns into a subset of the scene can be straight lines similar to barcodes with pre-arranged spacing, or it can be intersecting straight lines. The thicknesses of the intersecting lines can be fixed or varying. In the case of varying spacing, all or some of the lines may intersect at the same point. One can also use a portion of a standard high resolution pattern for this purpose. An example is shown in FIG. 9.

People will not see the projected infra-red pattern but a scene camera can capture the projected pattern and use that as a known high resolution portion of the scene. The pattern may also be projected onto a boundary of the scene and that boundary may be cropped out in the final output image or removed via image subtraction.

It is also possible to periodically project a pattern onto a scene so that only every other frame of the capturing camera will see the pattern. If the projected pattern appears on every other frame, at least two images of the scene need to be captured. Via image subtraction, the projected pattern can be cancelled out and via super resolution, the resolution of the scene can be increased. To generate a high resolution image of a scene, the image with patterns is processed first to increase its resolution. The known pattern is then subtracted. It is also possible in the increased resolution image the subset corresponding to the patterns is replaced by the corresponding subset from the image without the patterns. Super resolution technique is used again to increase the resolution of the added new subset if needed.

The image of the infra-red patterns on the scene can also be used to extract the depth map of the scene. This is done by studying the distortion of the projected patterns on the scene and comparing them with an undistorted pattern.

The word "high" in high resolution is relative. In the frequency domain, a higher resolution image will have a larger spectral bandwidth than a lower resolution image. There are standard patterns that are used for testing a camera's spatial frequency bandwidth or its modulation transfer function (MTF). MTF will measure the combined effect of the lens, image sensor and the electronic circuitry of the camera. Patterns used by opticians to test a subject's eyes are examples of images with varying high resolution contents; smaller characters have higher spatial frequency contents.

Application: Visual Aid for People with Low Vision

For reading applications using Optical Character Recognition (OCR), an eyewear camera may be used. A user may point to a word or a part of a page to indicate what the user is asking about. The user may also hold a text in front of the camera. In some cases, it will be useful to the user to show where each word appears or from where the reading started. To achieve this, the eyewear may project a visible light such as a light from a low power laser diode onto the text area to display or confirm the location of the text and words that are being read. The user will see where the light is pointed at and if needed, the user can provide a feedback to correct the selected location by pointing to a different part of the text or page. An actuator or a MEMS device may be used to steer the laser beam within the field of view of the scene camera of the eyewear. Additionally, the laser beam can also be used to communicate the field of view of the scene camera to a user by marking the boundaries of the FOV or its center point.

Due to space limitation, weight, cost and esthetics of an assistive eyewear, small camera modules are used to view a scene. Yet, these devices are expected to be able to read small prints on a page or medication labels. Due to such constraints, computational optics is a suitable choice to achieve optical zoom or increase the optical resolution of an image taken by the eyewear. The single camera super resolution technique that was presented in this disclosure is a suitable match for this application. Specifically, by placing a known picture or object within the FOV of the camera, the camera will be able to achieve optical zooming via computational methods.

People with low vision may place a book or paper on a table or a desk that already has a known high resolution pattern. An image taken of the text will include the image of the known high resolution pattern. Super resolution techniques are used to increase the resolution of the captured image of the text to make it easier for an OCR software to recognize the characters and the words in the text.

The patterns may be designed in such a way that it would allow zooming into the images captured by the low resolution camera by factors of 2, 3, 4, 5, and up to N, where N is the maximum desired zoom level. In general, known pictures or patterns with high spatial frequencies, meaning having small and fine details, will allow more zooming into a scene. There are already standard patterns that are used to characterize the spatial frequency response of a camera. Those and similar patterns can be used as known patterns or auxiliary pictures for single camera super resolution. Such standard patterns may also be placed in public places to increase the optical resolution of any camera.

For assisting low vision people with reading, a number of configurations can be used to benefit from single camera optical super resolution technique. These include:

- Making special books that have a standard high resolution pattern printed on the edges or margins of each page.
- Using a removable sticker that has a high resolution pattern and stick that on top of each page than needs to be read.
- Using a bookmark with high resolution pattern.
- Using the font type and size of the text as a known pattern and providing that information to the imaging device.
- Capturing several pictures of a page as the distance of a camera is reduced with respect to the page of interest. The several pictures can be fused together to create a single high resolution image of the page.

Application: Large Event Photography

In a concert hall or stadium, many time people take pictures of the stage, field and players or performers on the stage but because of the large distance, little details are captured. This problem can be solved with the help of and by installing known high resolution patterns around the field in a stadium or on the stage in a concert hall. Once people take a picture that includes the known patterns, they can use a super-resolution program to increase the resolution of their pictures which in effect means optical zooming into the scene. The super-resolution program may be installed on an online server that performs resolution enhancement or it can be installed on the image capturing device. The program will be aware of the known high resolution patterns and uses the images of those patterns to increase the resolution of an image of the scene. In the case of using a server, people will upload their images of the scene and get back higher resolution copies of the uploaded images.

The patterns can be simple horizontal and vertical barcodes or concentric circles with varying thickness and spacing. The patterns may be intersecting lines. The patterns can also be the installed posters or displayed pictures at the stadium or any other known picture or pattern.

Application: Optical Inspection for Manufacturing

In manufacturing environment, Optical Inspection of electronic boards is routinely performed using a robotic arm that moves a camera over a board to inspect it. Each component and how it is soldered to the board is inspected individually. There are hundreds of components on such boards and hundreds of images must be taken to evaluate each board. If the same objective can be achieved with a single image, productivity can be increased significantly. To achieve this goal, a high resolution pattern is placed on a printed circuit board (PCB) and an image of the board is captured and its resolution is increased before the image is searched for potential defects. It's also possible to print high resolution patterns on the PCB itself.

Application: Flow Control Device Using Eye Tracking

There are a number of commercially available automatic flow control devices, especially for water flow control.

Figure 10B:
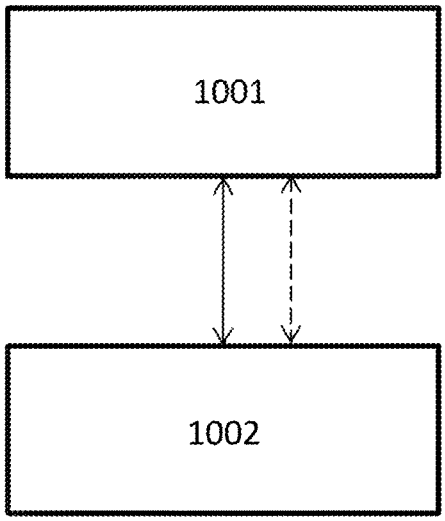

These include infra-red based sensors. Some mechanical flow control devices are manual and stay on for a pre-determined amount of time before they shut off automatically. These binary devices are generally used in public places to save water consumption. There is a need a multi-functional hands-free device both at home and in public places. An eye tracking based device that monitors a user's gaze points can address many of the shortcomings of the existing solutions. An eye tracking device is installed next to a faucet or water dispensing unit. This tracking unit can have manual and automatic flow control. In this application, the focus is on implementing the automatic control. The eye tracker will have an infra-red light source and a black & white or gray scale camera and will be placed close to the faucet. The eye tracker unit is placed in an enclosure and will have a faceplate with a menu of items such as "turn on", "turn off", "increase the flow rate", "reduce the flow rate", "increase temperature" and "reduce temperature". A user can select any menu item and activate it by starring at the menu item for a pre-determined time. A menu item can also be selected with eye, hands or head gestures, or via voice. Eye gestures such as a blink or double blink or a wink can be used as control signals. Head or hand gestures or voice commands may also be used as control signals. This allows people full hands-free control via an eye interface. The eye tracker can also use face recognition to save each user's preferences in terms of water temperature and flow rate. When no face is detected, the unit may shut off the water flow. Alternatively, a second camera can be used for face recognition. The estimated angular location of a face with respect to the eye tracking unit can be used to guide the eye tracker camera and facilitate its search for detecting a user's eyes. A layout for the eye tracking user interface is shown in FIG. 10a. As shown in FIG. 10b, the eye tracking user interface is in communication with flow control units. The communication can be made via wire or wireless platforms such as Bluetooth.

I claim:

1. A security imaging system comprising:

a camera for capturing at least one image of a scene wherein the scene includes a poster of at least one predetermined resolution test pattern;

an electronic storage unit for storing at least one image of the at least one predetermined resolution test pattern; and at least one processor, in communication with the camera and the electronic storage unit, the at least one processor configured to:

receive the at least one image of the scene from the camera, and initiate, upon detecting a motion in the scene based upon the at least one image of the scene, an iterative bandwidth extrapolation procedure to increase the image resolution of a subset of the least one image of the scene based upon the at least one image of the scene and the at least one image of the at least one predetermined resolution test pattern wherein the one subset of the at least one image of the scene has no overlap with the image of the poster in the at least one image of the scene.

2. The security imaging system of claim 1 further comprising an enclosure wherein the camera, the electronic storage unit and the at least one processor are disposed on or in the enclosure.

3. The security imaging system of claim 1 wherein the camera resides in a first enclosure and the at least one processor resides in a second enclosure.

4. The security imaging system of claim 3 wherein the camera is in communication with the at least one processor via at least one wireless link.

5. The security imaging system of claim 4 wherein the at least one wireless link is provided by a wireless router.

6. The security imaging system of claim 5 wherein the wireless router is a mesh wireless router.

7. The security imaging system of claim 1 wherein the at least one processor is further configured to perform face recognition and object recognition in the at least one image of the scene.

[8. The security imaging system of claim 1 further comprising a second camera for capturing a second image of the scene.]

[9. The security imaging system of claim 8 wherein the first and the second cameras have rectangular pixels and the ratio of the length to the width of each pixel is equal or larger than 2.]

10. The security imaging system of claim 1 wherein the at least one processor is further configured to:

recognize a face in the at least one image of the scene, maintain a history of the at least one recognized face, and take an action when a new face is detected.

11. The security imaging system of claim 1 wherein the camera is a CCTV camera.

12. An imaging method comprising:

capturing, via a camera, at least one image of a scene wherein the scene includes a poster of at least one predetermined resolution test pattern;

storing at least one image of the at least one predetermined resolution test pattern; and initiating, via at least one processor and upon detecting a motion in the scene, an iterative image resolution enhancement procedure to increase the image resolution of a subset of the least one image of the scene based upon the at least one image of the scene and the at least one image of the at least one predetermined resolution test pattern wherein the one subset of the at least one image of the scene has no overlap with the image of the poster in the at least one image of the scene.

13. The imaging method of claim 12 wherein the iterative image resolution enhancement procedure includes at least a bandwidth extrapolation technique.

14. The imaging method of claim 12 further comprising:

initiating a face recognition procedure based upon the at least one image of the scene, maintaining a history of the at least one recognized face, and taking an action when a new face is detected.

15. The imaging method of claim 12 wherein the camera resides in a first enclosure and the at least one processor resides in a second enclosure and the camera and the at least one processor are in communication via a wireless link.

16. The imaging method of claim 12 wherein the camera is a CCTV camera.

17. A security imaging system comprising:

a CCTV camera for capturing at least one image of a scene wherein the scene includes a poster of at least one predetermined resolution test pattern;

an electronic storage unit for storing at least one image of the at least one predetermined resolution test pattern; and at least one processor in communication with the CCTV camera and the electronic storage unit, the at least one processor configured to:

receive the at least one image of the scene from the CCTV camera, initiate, upon detecting a motion in the scene based upon the at least one image of the scene, an iterative bandwidth extrapolation procedure to increase the image resolution of a subset of the least one image of the scene based upon the at least one image of the scene and the at least one image of the at least one predetermined resolution test pattern wherein the one subset of the at least one image of the scene has no overlap with the image of the poster in the at least one image of the scene.

18. The security imaging system of claim 15 wherein the iterative bandwidth extrapolation procedure uses at least a portion of the spatial frequency spectra of the at least one image of the at least one predetermined resolution test pattern in order to increase the image resolution of the subset of the at least one image of the scene.

* * * * *